(12) United States Patent
Kontomaris

(10) Patent No.: US 9,745,496 B2
(45) Date of Patent: Aug. 29, 2017

(54) PRODUCING HEATING USING WORKING FLUIDS COMPRISING Z-1,1,1,4,4,4-HEXAFLUORO-2-BUTENE

(75) Inventor: Konstantinos Kontomaris, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 485 days.

(21) Appl. No.: 13/979,662

(22) PCT Filed: Jan. 31, 2012

(86) PCT No.: PCT/US2012/023267
§ 371 (c)(1),
(2), (4) Date: Jul. 15, 2013

(87) PCT Pub. No.: WO2012/106305
PCT Pub. Date: Aug. 9, 2012

(65) Prior Publication Data
US 2013/0298581 A1      Nov. 14, 2013

Related U.S. Application Data

(60) Provisional application No. 61/437,964, filed on Jan. 31, 2011, provisional application No. 61/525,296, filed on Aug. 19, 2011.

(51) Int. Cl.
*F25B 7/00*           (2006.01)
*C09K 5/04*           (2006.01)
(Continued)

(52) U.S. Cl.
CPC .............. *C09K 5/044* (2013.01); *C09K 5/045* (2013.01); *F25B 30/02* (2013.01); *F25D 17/00* (2013.01);
(Continued)

(58) Field of Classification Search
CPC .............. F25B 30/02; F25B 9/006; F25B 7/00
See application file for complete search history.

(56) References Cited

U.S. PATENT DOCUMENTS 4,541,943 A  *  9/1985  Powell .................. C09K 5/045
                                                    252/67
6,274,781 B1    8/2001  Furmanek et al.
(Continued)

FOREIGN PATENT DOCUMENTS

GB      1 578 933 A       11/1980
WO    2008/134061 A2     11/2008
(Continued)

OTHER PUBLICATIONS

PCT International Search Report and Written Opinion mailed May 24, 2012.
(Continued)

*Primary Examiner* — Elizabeth Martin
(74) *Attorney, Agent, or Firm* — N. Lynn Tucker

(57) ABSTRACT

Disclosed herein is a method for producing heating in a high temperature heat pump comprising condensing a vapor working fluid comprising Z-1,1,1,4,4,4-hexafluoro-2-butene, in a condenser, thereby producing a liquid working fluid. Also disclosed herein is a method of raising the maximum feasible condenser operating temperature in a high temperature heat pump apparatus comprising charging the high temperature heat pump with a working fluid comprising Z-1,1,1,4,4,4-hexafluoro-2-butene. Also disclosed herein is a composition comprising: (a) Z-1,1,1,4,4,4-hexafluoro-2-butene; (b) 2-chloropropane; and (c) at least one lubricant suitable for use at a temperature of at least about 150° C.; is wherein the 2-chloropropane is present in an amount effective to form an azeotrope or azeotrope-like combination with the Z-1,1,1,4,4,4-hexafluoro-2-butene.
(Continued)

Also disclosed herein is a high temperature heat pump apparatus containing a working fluid comprising Z-1,1,1,4,4,4-hexafluoro-2-butene.

10 Claims, 3 Drawing Sheets

(51) Int. Cl.
*F25B 30/02* (2006.01)
*F25D 17/00* (2006.01)

(52) U.S. Cl.
CPC .. *C09K 2205/122* (2013.01); *C09K 2205/126* (2013.01)

(56) References Cited

U.S. PATENT DOCUMENTS

| | | | |
|---|---|---|---|
| 2004/0031948 | A1 | 2/2004 | Jannick et al. |
| 2006/0106263 | A1 | 5/2006 | Miller et al. |
| 2006/0242985 | A1* | 11/2006 | Leck ............... B60H 1/3223 62/323.1 |
| 2007/0108403 | A1 | 5/2007 | Sievert et al. |
| 2008/0269532 | A1 | 10/2008 | Swearingen |
| 2010/0064699 | A1* | 3/2010 | Llurens ............... F24F 5/0046 62/79 |
| 2011/0094259 | A1* | 4/2011 | Lifson ............... F25B 1/10 62/510 |
| 2011/0144216 | A1* | 6/2011 | Hulse ............... A01N 29/02 514/757 |
| 2012/0117990 | A1 | 5/2012 | Rached et al. |
| 2012/0159976 | A1* | 6/2012 | Kontomaris ........ C09K 5/045 62/115 |

FOREIGN PATENT DOCUMENTS

| | | |
|---|---|---|
| WO | 2009/048463 A1 | 4/2009 |
| WO | 2009/155490 A1 | 12/2009 |
| WO | 2010/006006 A1 | 1/2010 |
| WO | 2011/034929 A1 | 3/2011 |
| WO | 2011/084553 A2 | 7/2011 |

OTHER PUBLICATIONS

Angelino G. et al., Supercritical Heat Pump Cycles, Int. J. Refrig., 1994, pp. 543-554, vol. 17, No. 8.
2006 ASHRAE® Handbook, Refrigeration, Chapter 4, Secondary Coolants in Refrigeration Systems, pp. 4.1-4.6.
ANSI/ASHRAE Standard 34-2007, Designation and Safety Classification of Refrigerants, 2007, Atlanta, GA.
ANSI/ASHRAE Standard 97-2007, Sealed Glass Tube Method to Test the Chemical Stability of Materials for Use within Refrigerant Systems, 2007, Atlanta, GA.
Brown, J S et al., The fluorinated olefin R-1234ze(Z) as a high-temperature heat pumping refrigerant, International Journal of Refrigeration, Sep. 1, 2009, pp. 1412-1422, vol. 32, No. 6, Elsevier, Paris, France.
Calm, James M. et al., HPAC Engineering, Refrigerant Data Update, Heating/Piping/Air Conditioning Engineering, Jan. 2007, pp. 50-64, vol. 79(1).
Doherty, M. F., et al., Conceptual Design of Distillation Systems, 2001, pp. 185-186 and 351-359, McGraw-Hill (New York).
Climate Change 2007—The Physical Science Basis, Contribution of Working Group I to the Fourth Assessment Report of the IPCC, Chapter 2, pp. 212-213, Table 2.14.
Scientific Assessment of Ozone Depletion: 2002, World Meteorological Organization, 2002, Chapter 1, Controlled Substances and Other Source Gases, section 1.4.4, pp. 1.28, 1.31 1:1.
Zhang, Shengjun et al., Experimental investigation of moderately high temperature water source heat pump with non-azeotropic refrigerant mixture, Applied Energy, May 1, 2010, pp. 1554-1561, vol. 87, No. 5, Elsevier Science Publishers, GB.

* cited by examiner

PRODUCING HEATING USING WORKING FLUIDS COMPRISING Z-1,1,1,4,4,4-HEXAFLUORO-2-BUTENE

This application is a national filing under 35 U.S.C. 371 of International Application No. PCT/US2012/23267 filed Jan. 31, 2012, and claims priority of U.S. Provisional Application No. 61/437,964 filed Jan. 31, 2011, and U.S. Provisional Application No. 61/525,296 filed Aug. 19, 2011.

FIELD OF THE INVENTION

The present disclosure relates to compositions as well as high temperature methods and apparatus for producing heating using working fluids comprising Z-1,1,1,4,4,4-hexafluoro-2-butene.

BACKGROUND OF THE INVENTION

Conventional methods of producing heating, including burning fossil fuels and electric resistance heat generation, have disadvantages of increasing operating costs and, relatively, low energy efficiency. Heat pumps provide an improvement over these methods.

Heat pumps extract low temperature heat from some available source through evaporation of a working fluid at an evaporator, compress the working fluid vapor to higher pressures and temperatures and supply high temperature heat by condensing the working fluid vapor at a condenser. Residential heat pumps use working fluids such as R410A to provide air conditioning and heating to homes. High temperature heat pumps using either positive displacement or centrifugal compressors use various working fluids, such as HFC-134a, HFC-245fa and CFC-114, among others.

The choice of working fluid for a high temperature heat pump is limited by the highest condenser operating temperature required for the intended application and the resulting condenser pressure. The working fluid must be chemically stable at the highest system temperatures. The working fluid vapor pressure at the maximum condenser temperature must not exceed the feasible operating pressure of available compressors and heat exchangers. For subcritical operation, the working fluid critical temperature must exceed the maximum condenser operating temperature.

Increasing energy costs, global warming and other environmental impacts, in combination with the relatively low energy efficiency of heating systems that operate on fossil fuels and electrical resistance heating make heat pumps an attractive alternative technology. HFC-134a, HFC-245fa and CFC-114 have high global warming potential and CFC-114 also has a high ozone depletion potential. There is a need for low global warming potential, low ozone depletion potential working fluids for use in high temperature heat pumps. Fluids that enable operation of existing heat pump equipment designed for CFC-114 or HFC-245fa at higher condenser temperatures while still attaining an adequate heating capacity would be particularly advantageous.

SUMMARY OF THE INVENTION

Use of Z-HFO-1336mzz in high temperature heat pumps increases the capability of these heat pumps because it allows operation at condenser temperatures higher than achievable with working fluids used in similar systems today. The condenser temperatures achieved with HFC-245fa and CFC-114 are the highest achievable with current systems.

Disclosed herein is a method for producing heating in a high temperature heat pump comprising condensing a vapor working fluid comprising 1,1,1,4,4,4-hexafluoro-2-butene, in a condenser, thereby producing a liquid working fluid.

Also disclosed herein is a method of raising the maximum feasible condenser operating temperature in a high temperature heat pump apparatus suitable for use with a first working fluid selected from the group consisting of CFC-114, HFC-134a, HFC-236fa, HFC-245fa, CFC-11 and HCFC-123 relative to the maximum feasible condenser operating temperature when the first working fluid is used as the heat pump working fluid, comprising charging the high temperature heat pump with a second working fluid comprising Z-1,1,1,4,4,4-hexafluoro-2-butene.

Also disclosed herein is a method for replacing a working fluid selected from the group consisting of CFC-114, HFC-134a, HFC-236fa, HFC-245fa, CFC-11 and HCFC-123 in a high temperature heat pump designed for said working fluid comprising providing a replacement working fluid comprising Z-1,1,1,4,4,4-hexafluoro-2-butene.

Also disclosed herein are compositions comprising (a) Z-1,1,1,4,4,4-hexafluoro-2-butene; (b) 2-chloropropane; and (c) at least one lubricant suitable for use at a temperature of at least about 150° C.; wherein the 2-chloropropane is present in an amount effective to form an azeotrope or azeotrope-like combination with the Z-1,1,1,4,4,4-hexafluoro-2-butene.

Also disclosed is a high temperature heat pump apparatus containing a working fluid comprising Z-1,1,1,4,4,4-hexafluoro-2-butene.

DETAILED DESCRIPTION

Figure 1:
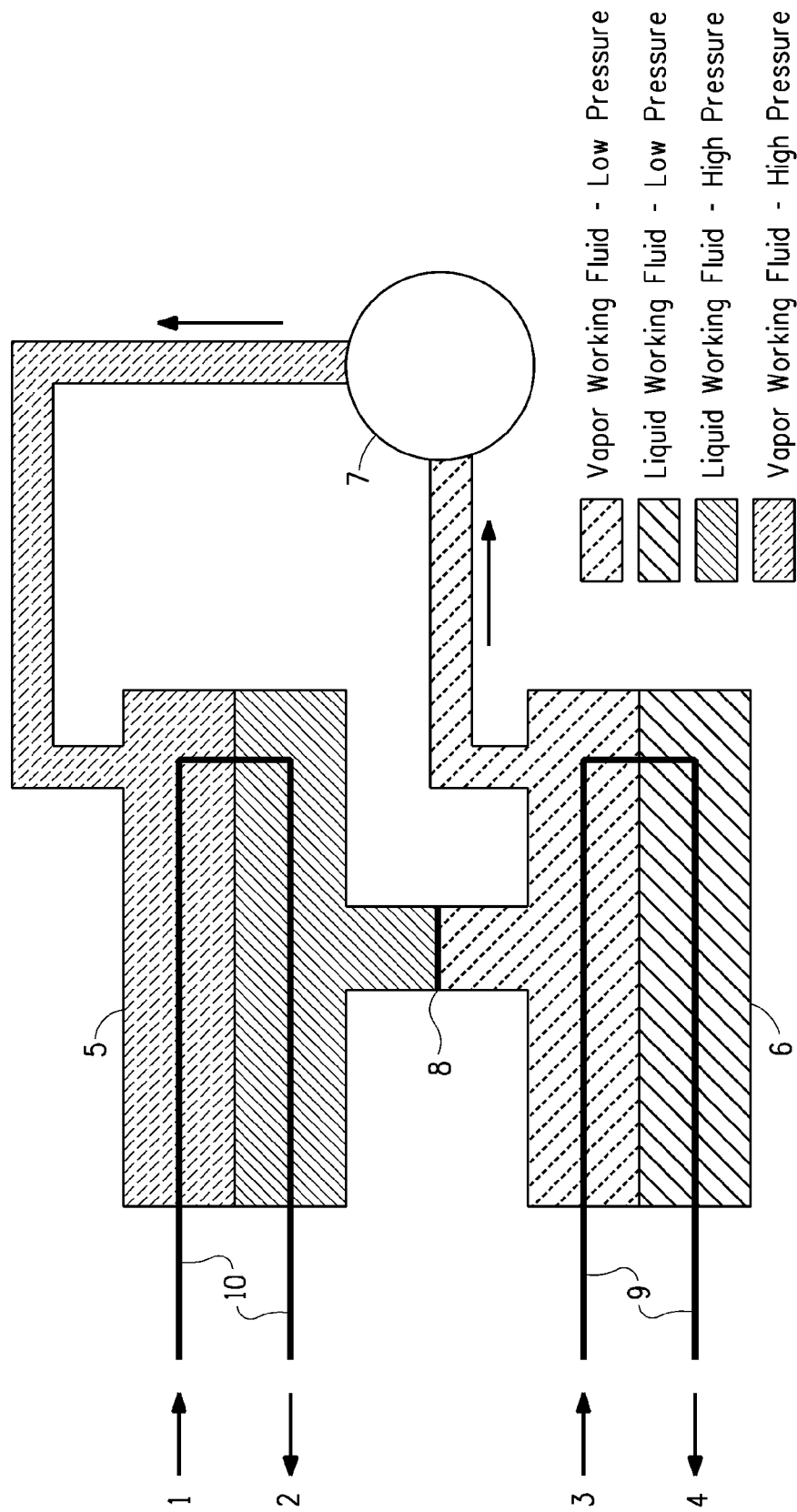
FIG. 1 is a schematic diagram of one embodiment of a flooded evaporator heat pump apparatus which utilizes Z-1,1,1,4,4,4-hexafluoro-2-butene as working fluid.

Before addressing details of embodiments described below, some terms are defined or clarified.

Global warming potential (GWP) is an index for estimating relative global warming contribution due to atmospheric emission of a kilogram of a particular greenhouse gas (such as a refrigerant or working fluid) compared to emission of a kilogram of carbon dioxide. GWP can be calculated for different time horizons showing the effect of atmospheric lifetime for a given gas. The GWP for the 100 year time horizon is commonly the value referenced. Any values for GWP reported herein are based on the 100 year time horizon.

Ozone depletion potential (ODP) is defined in "The Scientific Assessment of Ozone Depletion, 2002, A report of the World Meteorological Association's Global Ozone Research and Monitoring Project," section 1.4.4, pages 1.28 to 1.31 (see first paragraph of this section). ODP represents the extent of ozone depletion in the stratosphere expected from a compound (such as a refrigerant or working fluid) on a mass-for-mass basis relative to fluorotrichloromethane (CFC-11).

Cooling capacity (sometimes referred to as refrigeration capacity) is the change in enthalpy of a working fluid in an evaporator per unit mass of working fluid circulated through the evaporator. Volumetric cooling capacity is a term to define heat removed by the working fluid in the evaporator per unit volume of working fluid vapor exiting the evaporator and entering the compressor. The cooling capacity is a measure of the ability of a working fluid to produce cooling. Therefore, the higher the volumetric cooling capacity of the working fluid, the greater the cooling rate that can be produced at the evaporator with the maximum volumetric flow rate achievable with a given compressor.

Similarly, volumetric heating capacity is a term to define the amount of heat supplied by the working fluid in the condenser per unit volume of working fluid vapor entering the compressor. The higher the volumetric heating capacity of the working fluid, the greater the heating rate that is produced at the condenser with the maximum volumetric flow rate achievable with a given compressor.

Coefficient of performance (COP) for cooling is the amount of heat removed at the evaporator of a cycle divided by the required energy input to operate the cycle (e.g. to operate the compressor), the higher the COP, the higher the cycle energy efficiency. COP is directly related to the energy efficiency ratio (EER), that is, the efficiency rating for refrigeration, air conditioning, or heat pump equipment at a specific set of internal and external temperatures. Similarly, the coefficient of performance for heating is the amount of heat delivered at the condenser of a cycle divided by the required energy input to operate the cycle (e.g. to operate the compressor).

Temperature glide (sometimes referred to simply as "glide") is the absolute value of the difference between the starting and ending in temperatures of a phase-change process by a working fluid within a component of a cooling or heating cycle system, exclusive of any subcooling or superheating. This term may be used to describe condensation or evaporation of a near azeotrope or zeotropic composition. When referring to the temperature glide of a refrigeration, air conditioning is or heat pump system, it is common to provide the average temperature glide being the average of the temperature glide in the evaporator and the temperature glide in the condenser.

Subcooling is the reduction of the temperature of a liquid below that liquid's saturation temperature for a given pressure. By cooling the liquid working fluid exiting the condenser below its saturation point, the capacity of the working fluid to absorb heat during the evaporation step can be increased. Sub-cooling thereby improves both the cooling and heating capacity and energy efficiency of a cooling or heating system based on the conventional vapor-compression cycle.

Superheat is the increase of the temperature of the vapor exiting the evaporator above the vapor's saturation temperature at the evaporator pressure. By heating a vapor above the saturation point, the likelyhood of condensation upon compression is minimized. The superheat can also contribute to the cycle's cooling and heating capacity.

As used herein, a working fluid is a composition comprising a compound or mixture of compounds that primarily function to transfer heat from one location at a lower temperature (e.g. an evaporator) to another location at a higher temperature (e.g. a condenser) in a cycle wherein the working fluid undergoes a phase change from a liquid to a vapor, is compressed and is returned back to liquid through cooling of the compressed vapor in a repeating cycle. The cooling of a vapor compressed above its critical point can return the working fluid to a liquid state without condensation. The repeating cycle may take place in systems such as heat pumps, refrigeration systems, refrigerators, freezers, air conditioning systems, air conditioners, chillers, and the like. Working fluids may be a portion of formulations used within the systems. The formulations may also contain other components (e.g., additives) such as those described below.

As recognized in the art, an azeotropic composition is an admixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like composition means a composition that behaves like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

Additionally, azeotrope-like compositions exhibit dew point pressure and bubble point pressure with virtually no pressure differential. That is to say that the difference in the dew point pressure and bubble point pressure at a given temperature will be a small value. In this invention, compositions with a difference in dew point pressure and bubble point pressure of less than or equal to 5 percent (based upon the bubble point pressure) is considered to be azeotrope-like.

It is recognized in this field that when the relative volatility of a system approaches 1.0, the system is defined as forming an azeotropic or azeotrope-like composition. Relative volatility is the ratio of the volatility of component 1 to the volatility of component 2. The ratio of the mole fraction of a component in vapor to that in liquid is the volatility of the component.

To determine the relative volatility of any two compounds, a method known as the PTx method can be used. The vapor-liquid equilibrium (VLE), and hence relative volatility, can be determined either isothermally or isobarically. The isothermal method requires measurement of the total pressure of mixtures of known composition at constant temperature. In this procedure, the total absolute pressure in a cell of known volume is measured at a constant temperature for various compositions of the two compounds. The isobaric method requires measurement of the temperature of mixtures of known composition at constant pressure. In this procedure, the temperature in a cell of known volume is measured at a constant pressure for various compositions of the two compounds. Use of the PTx Method is described in detail in "Phase Equilibrium in Process Design", Wiley-Interscience Publisher, 1970, written by Harold R. Null, on pages 124 to 126; hereby incorporated by reference.

These measurements can be converted into equilibrium vapor and liquid compositions in the PTx cell by using an activity coefficient equation model, such as the Non-Random, Two-Liquid (NRTL) equation, to represent liquid phase non-idealities. Use of an activity coefficient equation, such as the NRTL equation is described in detail in "The Properties of Gases and Liquids," 4th edition, published by McGraw Hill, written by Reid, Prausnitz and Poling, on pages 241 to 387, and in "Phase Equilibria in Chemical Engineering," published by Butterworth Publishers, 1985, written by Stanley M. Walas, pages 165 to 244. Both is aforementioned references are hereby incorporated by reference. Without wishing to be bound by any theory or explanation, it is believed that the NRTL equation, together with the PTx cell data, can sufficiently predict the relative volatilities of the Z-1,1,1,4,4,4-hexafluoro-2-butene-containing compositions of the present invention and can therefore predict the behavior of these mixtures in multi-stage separation equipment such as distillation columns.

Flammability is a term used to mean the ability of a composition to ignite and/or propagate a flame. For working fluids, the lower flammability limit ("LFL") is the minimum concentration of the working fluid in air that is capable of propagating a flame through a homogeneous mixture of the working fluid and air under test conditions specified in ASTM (American Society of Testing and Materials) E681-2001. The upper flammability limit ("UFL") is the maximum concentration of the working fluid in air that is capable of propagating a flame through a homogeneous mixture of the composition and air as determined by ASTM E-681. For many refrigeration, air conditioning, or heat pump applications, the refrigerant or working fluid is desired (if not required) to be non-flammable.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic and novel characteristic(s) of the claimed invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

Compositions

Compositions as disclosed for use in the present methods and apparatus include working fluids comprising Z-1,1,1,1, 4,4,4-hexafluoro-2-butene (Z-HFO-1336mzz).

Z-HFO-1336mzz is a known compound, and its preparation method has been disclosed, for example, in U.S. Patent Application Publication No. 2008-0269532, hereby incorporated by reference in its entirety.

Compositions that may also be useful in certain embodiments of the present methods and apparatus may include compounds selected from the group consisting of difluoromethane (HFC-32), 2,3,3,3-tetrafluoropropene (HFO-1234yf), 1,3,3,3-tetrafluoropropene (HFO-1234ze, E and/or Z isomer), 1,1,1,2-tetrafluoroethane (HFC-134a), 1,1,2,2-tetrafluoroethane (HFC-134), and 1,1,1,2,3,3,3-heptafluoropropane (HFC-227ea).

HFO-1234ze is available commercially from certain fluorocarbon manufacturers (e.g., Honeywell International Inc.; Morristown, N.J.) or may be made by methods known in the art. In particular, E-HFO-1234ze may be prepared by dehydrofluorination of a 1,1,1,2,3-pentafluoropropane (HFC-245eb, $CF_3CHFCH_2F$) or 1,1,1,3,3-pentafluoropropane (HFC-245fa, $CF_3CH_2CHF_2$). The dehydrofluorination reaction may take place in the vapor phase in the presence or absence of catalyst, and also in the liquid phase by reaction with caustic, such as NaOH or KOH. These reactions are described in more detail in U.S. Patent Publication No. 2006/0106263, incorporated herein by reference.

HFO-1234yf may be made by methods known in the art as well. In particular, HFO-1234yf may be prepared by dehydrofluorination of a 1,1,1,2,3-pentafluoropropane (HFC-245eb, $CF_3CHFCH_2F$) or 1,1,1,2,2-pentafluoropropane (HFC-245cb, $CF_3CF_2CH_3$). The dehydrofluorination is reaction may take place in the vapor phase in the presence or absence of catalyst, and also in the liquid phase by reaction with caustic, such as NaOH or KOH. These reactions are described in more detail in U.S. Patent Publication No. 2006/0106263, incorporated herein by reference.

HFC-32 is commercially available or may be made by fluorodechlorination of methylene chloride by reaction with hydrogen fluoride in the presence of a suitable catalyst, such as described in U.S. Pat. No. 6,274,781.

HFC-134a and HFC-134 may be available commercially or may be prepared by methods known in the art, for example by the method described in United Kingdom Pat. No. 1578933 (incorporated herein by reference) by the hydrogenation of tetrafluoroethylene. The latter reaction may be conveniently effected at normal or elevated temperatures, for example up to 250° C., in the presence of a hydrogenation catalyst, for instance, palladium on alumina. Additionally, HFC-134 may be made by the hydrogenation of 1,2-dichloro-1,1,2,2-tetrafluoroethane (i.e., $CClF_2CClF_2$ or CFC-114) to 1,1,2,2-tetrafluoroethane as reported by J. L. Bitner et al. in U.S. Dep, Comm. Off. Tech, Serv/Rep. 136732, (1958), pp. 25-27, incorporated herein by reference. HFC-134a may be made by the hydrogenation of 1,1-dichloro-1,2,2,2-tetrafluoroethane (i.e., $CCl_2FCF_3$ or CFC-114a) to 1,1,1,2-tetrafluoroethane.

In one embodiment, the compositions disclosed herein may be used in combination with a desiccant in a refrigeration or air-conditioning equipment (including chillers), to aid in removal of moisture. Desiccants may be composed of activated alumina, silica gel, or zeolite-based molecular sieves. Representative molecular sieves include MOLSIV XH-7, XH-6, XH-9 and XH-11 (UOP LLC, Des Plaines, Ill.).

In one embodiment, the compositions disclosed herein may be used in combination with at least one lubricant selected from the group consisting of polyalkylene glycols, polyol esters, polyvinylethers, mineral oils, alkylbenzenes, synthetic paraffins, synthetic naphthenes, and poly(alpha) olefins.

In some embodiments, lubricants useful in combination with the compositions as disclosed herein may comprise those suitable for use with refrigeration or air-conditioning apparatus. Among these lubricants are those conventionally used in vapor compression refrigeration apparatus utilizing chlorofluorocarbon refrigerants. In one embodiment, lubricants comprise those commonly known as "mineral oils" in the field of compression refrigeration lubrication. Mineral oils comprise paraffins (i.e., straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). In one embodiment, lubricants comprise those commonly known as "synthetic oils" in the field of compression refrigeration lubrication. Synthetic oils comprise alkylaryls (i.e. linear and branched alkyl alkylbenzenes), synthetic paraffins and naphthenes, and poly(alphaolefins). Representative conventional lubricants are the commercially available BVM 100 N (paraffinic mineral oil sold by BVA Oils), naphthenic mineral oil commercially available from Crompton Co. under the trademarks Suniso® 3GS and Suniso® 5GS, naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500, and HAB 22 (branched alkylbenzene sold by Nippon Oil).

In other embodiments, lubricants may also comprise those which have been designed for use with hydrofluorocarbon refrigerants and are miscible with refrigerants of the present invention under compression refrigeration and air-conditioning apparatus operating conditions. Such lubricants include, but are not limited to, polyol esters (FOES) such as Castrol® 100 (Castrol, United Kingdom), polyalkylene glycols (PAGs) such as RL-488A from Dow (Dow Chemical, Midland, Mich.), polyvinyl ethers (PVEs), and polycarbonates (PCs).

Lubricants are selected by considering a given compressor's requirements and the environment to which the lubricant will be exposed.

Of note are high temperature lubricants with stability at high temperatures. The highest temperature the heat pump will achieve will determine which lubricants are required. In one embodiment, the lubricant must be stable at temperatures of at least 150° C. In another embodiment, the lubricant must be stable at temperatures of at least 155° C. In another embodiment the lubricant must be stable at temperatures of at least 165° C. Of particular note are poly alpha olefins (POA) lubricants with stability up to about 200° C. and polyol ester (POE) lubricants with stability at temperatures up to about 200 to 220° C. Also of particular note are perfluoropolyether lubricants that have stability at temperatures from about 220 to about 350° C. PFPE lubricants include those available from DuPont (Wilmington, Del.) under the trademark Krytox®, such as the XHT series with thermal stability up to about 300 to 350° C. Other PFPE lubricants include those sold under the trademark Demnum™ from Daikin Industries (Japan) with thermal stability up to about 280 to 330° C., and available from Ausimont (Milan, Italy), under the trademarks Fomblin® and Galden® such as that available under the trademark FombEin®Y Fomblin®-Z with thermal stability up to about 220 to 260° C.

For high temperature condenser operation (associated with high temperature lifts and high compressor discharge temperatures) formulations of working fluid (e.g. Z-HFO-1336mzz or blends containing Z-HFO-1336mzz) and lubricants with high thermal stability (possibly in combination with oil cooling or other mitigation approaches) will be advantageous.

In one embodiment, the present invention includes a composition comprising: (a) Z-1,1,1,4,4,4-hexafluoro-2-butene; (b) 2-chloropropane; and (c) at least one lubricant suitable for use at a temperature of at least about 150° C.; wherein the 2-chloropropane is present in an amount effective to form an azeotrope or azeotrope-like combination with the Z-1,1,1,4,4,4-hexafluoro-2-butene. Of note are embodiments wherein the lubricant is suitable for use at a temperature of at least about 155° C. Also of note are embodiments wherein the lubricant is suitable for use at a temperature of at least about 165° C.

Disclosed previously in PCT Patent Application publication No. WO2009/155490 (incorporated herein by reference in its entirety) that Z-HFO-1336mzz and 2-chloropropane form azeotropic compositions ranging from about 51.05 weight percent (33.3 mole percent) to about 99.37 weight percent (98.7 mole percent) Z-HFO-1336mzz and from about 0.63 weight percent (1.3 mole percent) to about 48.95 weight percent (66.7 mole percent) 2-chloropropane (which form azeotropic compositions boiling at a temperature of from about −50° C. to about 160° C. and at a pressure of from about 0.2 psia (1.4 kPa) to about 342 psia (2358 kPa)). For example, at 29.8° C. and atmospheric pressure (14.7 psia, 101 kPa) the azeotropic composition is 69.1 weight percent (51.7 mole %) Z-1,1,1,4,4,4-hexafluoro-2-butene and 30.9 weight percent (48.3 mole %) 2-chloropropane. Additionally disclosed were the azeotrope-like compositions formed between Z-HFO-1336mzz and 2-chloropropane. At temperatures of 20° C. and higher the azeotrope-like compositions contain from about 1 weight percent to about 99 weight percent of Z-HFO-1336mzz and from about 99 weight percent to about 1 weight percent 2-chloropropane.

Of particular utility will be non-flammable compositions comprising Z-HFO-1336mzz and 2-chloropropane. Compositions comprising Z-HFO-1336mzz and 2-chloropropane with less than 5 weight percent 2-chloropropane are expected to be non-flammable, while compositions containing 4 weight percent or less 2-chloropropane have been found to be non-flammable In one embodiment, the compositions may be used with about 0.01 weight percent to about 5 weight percent of a stabilizer, free radical scavenger or antioxidant. Such other additives include but are not limited to, nitromethane, hindered phenols, hydroxylamines, thiols, phosphites, or lactones. Single additives or combinations may be used.

Optionally, in another embodiment, certain refrigeration, air-conditioning, or heat pump system additives may be added, as desired, to the working fluids as disclosed herein in order to enhance performance and system stability. These additives are known in the field of refrigeration and air-conditioning, and include, but are not limited to, anti wear agents, extreme pressure lubricants, corrosion and oxidation inhibitors, metal surface deactivators, free radical scavengers, and foam control agents. In general, these additives may be present in the working fluids in small amounts relative to the overall composition. Typically concentrations of from less than about 0.1 weight percent to as much as about 3 weight percent of each additive are used. These additives are selected on the basis of the individual system requirements. These additives include members of the triaryl phosphate family of EP (extreme pressure) lubricity additives, such as butylated triphenyl phosphates (BTPP), or other alkylated triaryl phosphate esters, e.g. Syn-0-Ad 8478 from Akzo Chemicals, tricresyl phosphates and related compounds. Additionally, the metal dialkyl dithiophosphates (e.g., zinc dialkyl dithiophosphate (or ZDDP), Lubrizol 1375 and other members of this family of chemicals may be used in compositions of the present invention. Other anti-wear additives include natural product oils and asymmetrical polyhydroxyl lubrication additives, such as Synergol TMS (International Lubricants). Similarly, stabilizers such as antioxidants, free radical scavengers, and water scavengers may be employed. Compounds in this category can include, but are not limited to, butylated hydroxy toluene (BHT), epoxides, and mixtures thereof. Corrosion inhibitors include dodecyl succinic acid (DDSA), amine phosphate (AP), oleoyl sarcosine, imidazone derivatives and substituted sulfphonates. Metal surface deactivators include areaoxalyl bis (benzylidene) hydrazide (CAS rag no. 6629-10-3), N,N'-bis (3,5-di-tert-butyl-4-hydroxyhydrocinnamoylhydrazine (CAS reg no 32687-78-8), 2,2,'-oxamidobis-ethyl-(3,5-di-tert-butyl-4-hydroxyhydrocinnamate (CAS rag no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof.

In other embodiments, additional additives include stabilizers comprising at least one compound selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof. Representative stabilizer compounds include but are not limited to tocopherol; hydroquinone; t-butyl hydroquinone; monothiophosphates; and dithiophosphates, commercially available from Ciba Specialty Chemicals, Basel, Switzerland, hereinafter "Ciba," under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168; a phosphate such as (Tris-(di-tert-butylphenyl), commercially available from Ciba under the trademark Irgafos® OPH; (Di-n-octyl phosphite); and iso-decyl diphenyl phosphite, commercially available from Ciba under the trademark Irgafos® DDPP; anisole; 1,4-dimethoxybenzene; 1,4-diethoxybenzene; 1,3,5-trimethoxybenzene; d-limonene; retinal; pinene; menthol; Vitamin A; terpinene; dipentene; lycopene; beta carotene; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methyl-cyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl his tallow amine; bis tallow amine; phenol-alpha-naphthylamine; bis(dimethyl-amino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzaphenone; 2-chlorobenzophenone; benzyl phenyl sulfide; diphenyl sulfide; dibenzyl sulfide; ionic liquids; and others.

In one embodiment, ionic liquid stabilizers comprise at least one ionic liquid. Ionic liquids are organic salts that have melting points below 100° C. In another embodiment, ionic liquid stabilizers comprise salts containing cations selected from the group consisting of pyridinium, pyridazinium, pyrimidinium, pyrazinium, imidazolium, pyrazolium, thiazolium, oxazolium and triazolium; and anions selected from the group consisting of $[BF_4]-$, $[PF_6]-$, $[SbF_6]-$, $[CF_3SO_3]-$, $[HCF_2CF_2SO_3]-$, $[CF_3HFCCF_2SO_3]-$, $[HCClFCF_2SO_3]-$, $[(CF_3SO_2)_2N]-$, $[(CF_3CF_2SO_2)_2N]-$, $[(CF_3SO_2)_3C]-$, $[CF_3CO_2]-$, and $F-$. Representative ionic liquid stabilizers include emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

Heat Pumps

In one embodiment of the present invention is provided a heat pump apparatus containing a working fluid comprising Z-1,1,1,4,4,4-hexafluoro-2-butene.

A heat pump is a type of apparatus for producing heating and/or cooling. A heat pump includes an evaporator, a compressor, a condenser, and an expansion device. A working fluid circulates through these components in a repeating cycle. Heating is produced at the condenser where energy (in the form of heat) is extracted from the vapor working fluid as it is condensed to form liquid working fluid. Cooling is produced at the evaporator where energy is absorbed to evaporate the working fluid to form vapor working fluid.

Figure 2:
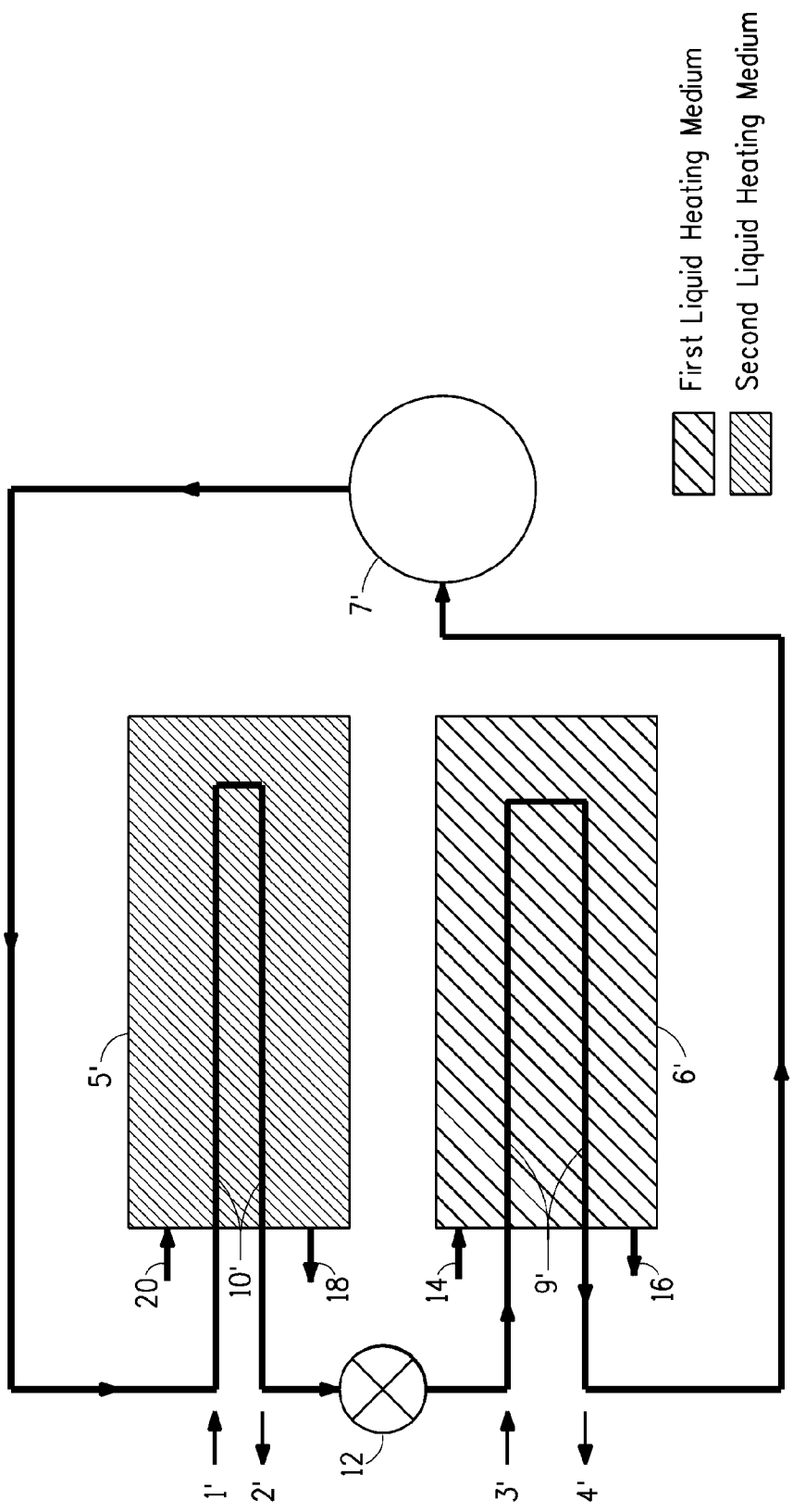
FIG. 2 is a schematic diagram of one embodiment of a direct expansion heat pump apparatus which utilizes Z-1,1,1,4,4,4-hexafluoro-2-butene as working fluid.

Heat pumps may include flooded evaporators one embodiment of which is shown in FIG. 1, or direct expansion evaporators one embodiment of which is shown in FIG. 2.

Heat pumps may utilize positive displacement compressors OF dynamic compressors. Positive displacement compressors include reciprocating, screw, or scroll compressors. Of note are heat pumps that use screw compressors. Dynamic compressors include centrifugal and axial compressors. Also of note are heat pumps that use centrifugal compressors.

Residential heat pumps are used to produce hot air to warm a residence or home (including single family or multi-unit attached homes) and produce maximum condenser operating temperatures from about 30° C. to about 50° C.

Of note are high temperature heat pumps that may be used to heat air, water, another heat transfer medium or some portion of an industrial process, such as a piece of equipment, storage area or process stream. These heat pumps can produce maximum condenser operating temperatures greater than about 55° C. The maximum condenser operating temperature that can be achieved in a high temperature heat pump depends upon the working fluid used. This maximum condenser operating temperature is limited by the normal boiling characteristics of the working fluid (e.g. saturation pressure and critical temperature) and also by the pressure to which the heat pump's compressor can raise the vapor working fluid pressure. The maximum temperature to which the working fluid can be exposed is limited by the thermal stability of the working fluid.

Of particular value are high temperature heat pumps that operate at condenser temperatures of at least about 100° C. Z-HFO-1336mzz enables the design and operation of centrifugal heat pumps, operated at condenser temperatures higher than those accessible with many currently available working fluids. Of note are embodiments using working fluids comprising Z-HFO-1336mzz operated at condenser temperatures up to about 150° C. Also of note are embodiments using working fluids comprising Z-HFO-1336mzz operated at condenser temperatures up to about 155° C. Also if note are embodiments using working fluids comprising Z-HFO-1336mzz operated at condenser temperatures up to about 165° C. Of particular note are embodiments using working fluids comprising Z-HFO-1336mzz operated at condenser temperatures of at least about 150° C. Examples include embodiments using working fluids comprising Z-HFO-1336mzz operated at condenser temperatures of at least about 155° C.; and embodiments using working fluids comprising Z-HFO-1336mzz operated at condenser temperatures of at least about 165° C.

Also of note are heat pumps that are used to produce heating and cooling simultaneously. For instance, a single heat pump unit may produce hot water for domestic use and may also produce cooling for comfort air conditioning in the summer.

Heat pumps, including both flooded evaporator and direct expansion, may be coupled with an air handling and distribution system to provide comfort air conditioning (cooling and dehumidifying the air) and/or heating to residence (single family or attached homes) and large commercial buildings, including hotels, office buildings, hospitals, universities and the like. In another embodiment, heat pumps may be used to heat water.

To illustrate how heat pumps operate, reference is made to the is Figures. A flooded evaporator heat pump is shown in FIG. 1. In this heat pump a first heat transfer medium, which is a warm liquid, which comprises water, and, in some embodiments, additives, or other heat transfer medium such as a glycol (e.g., ethylene glycol or propylene glycol), enters the heat pump carrying heat from a low temperature source, such as a building air handling system or warmed-up water from condensers of a chiller plant flowing to the cooling tower, shown entering at arrow 3, through a tube bundle or coil 9, in an evaporator 6, which has an inlet and an outlet. The warm first heat transfer medium is delivered to the evaporator, where it is cooled by liquid working fluid, which is shown in the lower portion of the evaporator. Note that in FIG. 1 the tube bundle or coil 9 is shown in the evaporator 6 to be located partially in the vapor working fluid and partially in the liquid working fluid. In most cases, the tube bundle or coil 9 will be fully immersed in the liquid working fluid contained in the evaporator 6. The liquid working fluid evaporates because it has an evaporation temperature (at the evaporator operating pressure) lower than the temperature of the warm first heat transfer medium which flows through tube bundle or coil 9. The cooled first heat transfer medium re-circulates back to the low temperature heat source as shown by arrow 4, via a return portion of tube bundle or coil 9. The liquid working fluid, shown in the lower portion of evaporator 6 in FIG. 1, vaporizes and is drawn into a compressor 7, which increases the pressure and temperature of the working fluid vapor. The compressor compresses this vapor so that it may be condensed in a condenser 5 at a higher pressure and temperature than the pressure and temperature of the working fluid vapor when it exits the evaporator. A second heat transfer medium enters the condenser at arrow 1 in FIG. 1 via a tube bundle or coil 10 in condenser 5 from a location to which high temperature heat is provided ("heat sink") such as a domestic or service water heater or a hydronic heating system FIG. The second heat transfer medium is warmed in the process and returned via a return loop of tube bundle or coil 10, as shown by arrow 2, to the heat sink. This second heat transfer medium cools the working fluid vapor in the condenser and causes the vapor to condense to liquid working fluid, so that there is liquid working fluid in the lower portion of the condenser as shown in FIG. 1. The condensed liquid working fluid in the condenser flows back to the evaporator through an expansion device 8, which, for example, may be an orifice or an expansion valve. Expansion device 8 reduces the pressure of the liquid working fluid, and converts the liquid working fluid partially to vapor, that is to say that the liquid working fluid flashes as pressure drops between the condenser and the evaporator. Flashing cools the working fluid, i.e., both the liquid working fluid and the working fluid vapor to the saturated temperature at evaporator pressure, so that both liquid working fluid and working fluid vapor are present in the evaporator.

In some embodiments the working fluid vapor is compressed to a supercritical state and vessel 5 in FIG. 1 represents a supercritical fluid cooler, often referred to as a gas cooler, where the working fluid is cooled to a liquid state without condensation.

In some embodiments the first heat transfer medium used in the apparatus depicted in FIG. 1 is chilled water returning from a building where air conditioning is provided or from some other body to be cooled. Heat is extracted from the returning chilled water at the evaporator 6 and the cooled chilled water is supplied back to the building or other body to be cooled. In this embodiment the apparatus depicted in FIG. 1 functions to simultaneously cool the first heat transfer medium that provides cooling to a body to be cooled (e.g. building air) and heat the second heat transfer medium that provides heating to a body to be heated (e.g. domestic or service water or process stream).

It is understood that the apparatus depicted in FIG. 1 can extract heat at the evaporator 6 from a wide variety of heat sources including solar, geothermal and waste heat and supply heat from the condenser 5 to a wide range of heat sinks.

It should be noted that for a single component working fluid composition, the composition of the vapor working fluid in the evaporator and condenser is the same as the composition of the liquid working fluid in the evaporator and condenser. In this case, evaporation and condensation occur at a constant temperature. However, if a working fluid blend (or mixture) is used, as in the present invention, the liquid working fluid and the working fluid vapor in the evaporator or in the condenser may have different compositions. This may lead to inefficient systems and difficulties in servicing the equipment, thus a single component working fluid is more desirable. An azeotrope or azeotrope-like composition will function essentially as a single component working fluid in a heat pump, such that the liquid composition and the vapor composition are essentially the same reducing any inefficiencies that might arise from the use of a non-azeotropic or non-azeotrope-like composition.

One embodiment of a direct expansion heat pump is illustrated in FIG. 2. In the heat pump as illustrated in FIG. 2, first liquid heat transfer medium, which is a warm liquid, such as warm water, enters an evaporator 6' at inlet 14. Mostly liquid working fluid (with a small amount of working fluid vapor) enters a coil 9' in the evaporator at arrow 3' and evaporates. As a result, first liquid heat transfer medium is cooled in the evaporator, and a cooled first liquid heat transfer medium exits the evaporator at outlet 16, and is sent to a low temperature heat source (e.g. warm water flowing to a cooling tower). The working fluid vapor exits the evaporator at arrow 4' and is sent to a compressor 7', where it is compressed and exits as high temperature, high pressure working fluid vapor. This working fluid vapor enters a condenser 5 through a condenser coil 10' at 1'. The working fluid vapor is cooled by a second liquid heat transfer medium, such as water, in the condenser and becomes a liquid. The second liquid heat transfer medium enters the condenser through a condenser heat transfer medium inlet 20. The second liquid heat transfer medium extracts heat from the condensing working fluid vapor, which becomes liquid working fluid, and this warms the second liquid heat transfer medium in the condenser. The second liquid heat transfer medium exits from the condenser through the condenser heat transfer medium outlet 18. The condensed working fluid exits the condenser through lower coil 10' at arrow 2' as shown in FIG. 2 and flows through an expansion device 12, which may be, for example, an orifice or an expansion valve. Expansion device 12 reduces the pressure of the liquid working fluid. A small amount of vapor, produced as a result of the expansion, enters the evaporator with liquid working fluid through coil 9' and the cycle repeats.

In some embodiments the working fluid vapor is compressed to a supercritical state and vessel 5' in FIG. 2 represents a supercritical fluid cooler, often referred to as a gas cooler, where the working fluid is cooled to a liquid state without condensation.

In some embodiments the first heat transfer medium used in the apparatus depicted in FIG. 2 is chilled water returning from a building where air conditioning is provided or from some other body to be cooled. Heat is extracted from the returning chilled water at the evaporator 6' and the cooled chilled water is supplied back to the building or other body to be cooled. In this embodiment the apparatus depicted in FIG. 2 functions to simultaneously cool the first heat transfer medium that provides cooling to a body to be cooled (e.g. budding air) and heat the second heat transfer medium that provides heating to a body to be heated (e.g. domestic or service water or process stream).

It is understood that the apparatus depicted in FIG. 2 can extract heat at the evaporator 6' from a wide variety of heat sources including solar, geothermal and waste heat and supply heat from the condenser 5' to a wide range of heat sinks.

Compressors useful in the present invention include dynamic compressors. Of note as examples of dynamic compressors are centrifugal compressors. A centrifugal compressor uses rotating elements to accelerate the working fluid radially, and typically includes an impeller and diffuser housed in a casing. Centrifugal compressors usually take working fluid in at an impeller eye, or central inlet of a circulating impeller, and accelerate it radially outward. Some pressure rise occurs in the impeller, but most of the pressure rise occurs in the diffuser, where kinetic energy is converted to potential energy (or loosely, momentum is converted to pressure). Each impeller-diffuser set is a stage of the compressor. Centrifugal compressors are built with from 1 to 12 or more stages, depending on the final pressure desired and the volume of refrigerant to be handled.

The pressure ratio, or compression ratio, of a compressor is the ratio of absolute discharge pressure to the absolute inlet pressure. Pressure delivered by a centrifugal compressor is practically constant over a relatively wide range of capacities. The pressure a centrifugal compressor can develop depends on the tip speed of the impeller. Tip speed is the speed of the impeller measured at the tips of its blades and is related to the diameter of the impeller and its rotational speed often expressed in revolutions per minute. The tip speed required in a specific application depends on the compressor work that is required to elevate the thermodynamic state of the working fluid from evaporator to condenser conditions. The volumetric flow capacity of the centrifugal compressor is determined by the size of the passages through the impeller. This makes the size of the compressor more dependent on the pressure required than the volumetric flow capacity required.

Also of note as examples of dynamic compressors are axial compressors. A compressor in which the fluid enters and leaves in the axial direction is called an axial flow compressor. Axial compressors are rotating, airfoil- or blade-based compressors in which the working fluid principally flows parallel to the axis of rotation. This is in contrast with other rotating compressors such as centrifugal or mixed-flow compressors where the working fluid may enter axially but will have a significant radial component on exit. Axial flow compressors produce a continuous flow of compressed gas, and have the benefits of high efficiencies and large mass flow capacity, particularly in relation to their cross-section. They do, however, require several rows of airfoils to achieve large pressure rises making them complex and expensive relative to other designs.

Compressors useful in the present invention also include positive displacement compressors. Positive displacement compressors draw vapor into a chamber, and the chamber decreases in volume to compress the vapor. After being compressed, the vapor is forced from the chamber by further decreasing the volume of the chamber to zero or nearly zero.

Of note as examples of positive displacement compressors are reciprocating compressors. Reciprocating compressors use pistons driven by a crankshaft. They can be either stationary or portable, can be single or multi-staged, and can be driven by electric motors or internal combustion engines. Small reciprocating compressors from 5 to 30 hp are seen in automotive applications and are typically for intermittent duty. Larger reciprocating compressors up to 100 hp are found in large industrial applications. Discharge pressures can range from low pressure to very high pressure (above 5000 psi or 35 MPa).

Also of note as examples of positive displacement compressors are screw compressors. Screw compressors use two meshed rotating positive-displacement helical screws to force the gas into a smaller space. Screw compressors are usually for continuous operation in commercial and industrial application and may be either stationary or portable. Their application can be from 5 hp (3.7 kW) to over 500 hp (375 kW) and from low pressure to very high pressure (above 1200 psi or 8.3 MPa).

Also of note as examples of positive displacement compressors are scroll compressors. Scroll compressors are similar to screw compressors and include two interleaved spiral-shaped scrolls to compress the gas. The output is more pulsed than that of a rotary screw compressor.

In one embodiment, the high temperature heat pump apparatus may comprise more than one heating circuit (or loop). The performance (coefficient of performance for heating and volumetric heating capacity) of high temperature heat pumps operated with Z-HFO-1336mzz as the working fluid is drastically improved when the evaporator is operated at temperatures approaching the condenser temperature required by the application, i.e. as the required temperature lift is reduced. When the heat supplied to the evaporator is only available at low temperatures, thus requiring high temperature lifts leading to poor performance, a dual fluid/dual circuit cascade cycle configuration can be advantageous. The low stage or low temperature circuit of the cascade cycle would be operated with a fluid of lower boiling point than Z-HFO-1336mzz and preferably with a, relatively, low GWP, such as HFC-32, HFO-1234yf, E-HFO-1234ze, HFC-134a, HFC-134, HFC-227ea and their blends such as HFO-1234yf/HFC-32, HFO-1234yf/HFC-134a, HFO-1234yf/HFC-134, HFO-1234yf/HFC-134a/HFC-134, E-HFO-1234ze/HFC-134a, E-HFO-1234ze/HFC-134, E-HFO-1234ze/HFC-134a/HFC-134, E-HFO-1234ze/HFC-227ea, HFO-1234ze-E/HFC-134/HFC-227ea, E-HFO-1234ze/HFC-134/HFC-134a/HFC-227ea, HFO-1234yf/E-HFO-1234ze/HFC-134/HFC-134a/HFC-227ea, etc. The evaporator of the low temperature circuit (or low temperature loop) of the cascade cycle receives the available low temperature heat, lifts the heat to a temperature intermediate between the temperature of the available low temperature heat and the temperature of the required heating duty and transfers the heat to the high stage or high temperature circuit (or high temperature loop) of the cascade system at a cascade heat exchanger. Then the high temperature circuit, operated with a working fluid comprising Z-HFO-1336mzz (e.g. a mixture of Z-HFO-1336mzz and 2-chloropropane), further lifts the heat received at the cascade heat exchanger to the required condenser temperature to meet the intended heating duty. The cascade concept can be extended to configurations with three or more circuits lifting heat over wider temperature ranges and using different fluids over different temperature sub-ranges to optimize performance.

Figure 3:
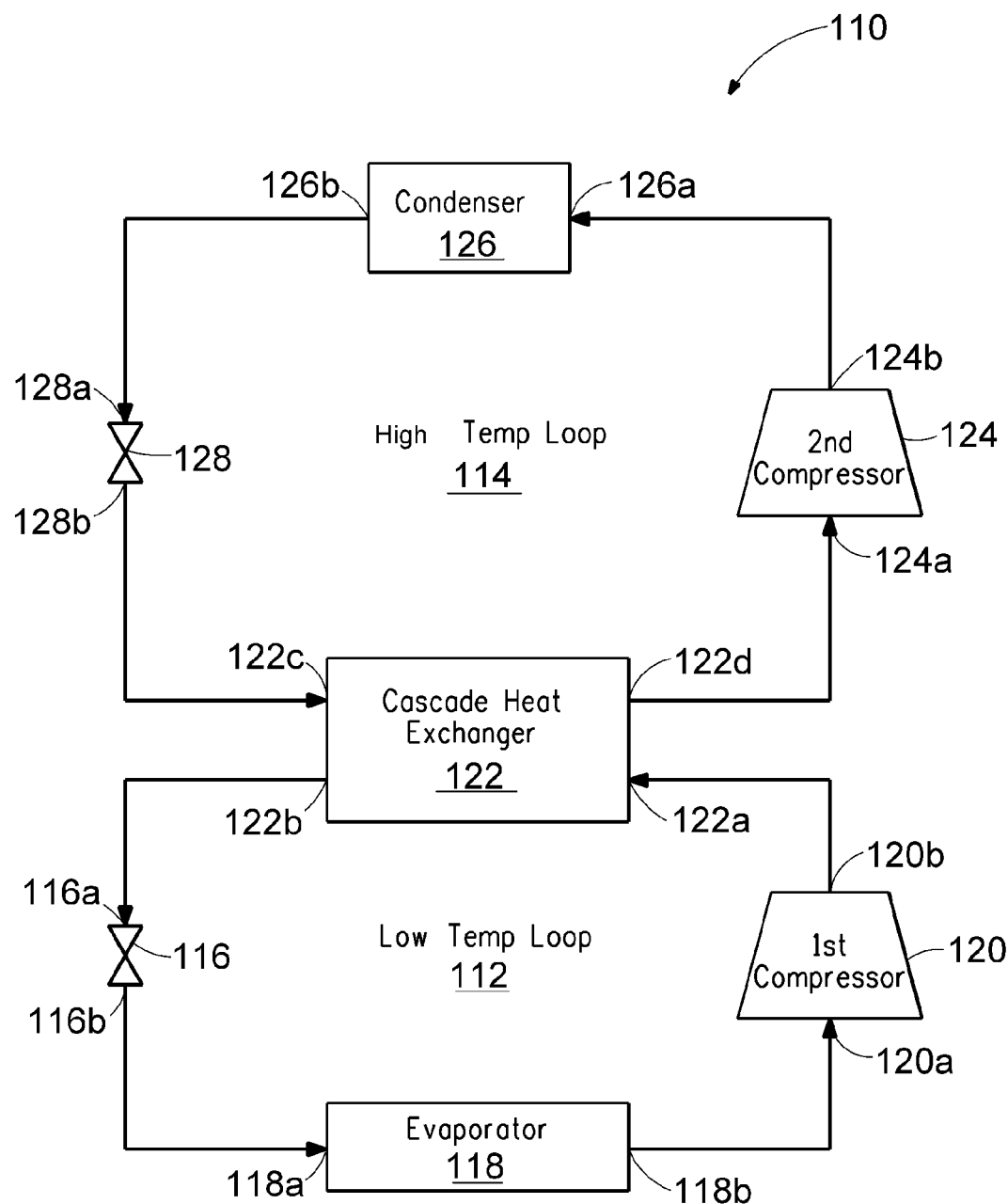
FIG. 3 is a schematic diagram of a cascade heating pump system which uses Z-1,1,1,4,4,4-hexafluoro-2-butene as working fluid.

In accordance with the present invention, there is provided a cascade heat pump system having at least two heating loops for circulating a working fluid through each loop. One embodiment of such a cascade system is shown generally at 110 in FIG. 3. The cascade heat pump system of the present invention has at least two heating loops, including a first, or lower loop 112 as shown in FIG. 3, which is a low temperature loop, and a second, or upper loop 114 as shown in FIG. 3, which is a high temperature loop 114. Each circulates a working fluid therethrough.

As shown in FIG. 3, the cascade heat pump system includes a first expansion device 116. The first expansion device has an inlet 116a and an outlet 116b. The first expansion device reduces the pressure and temperature of a first working fluid liquid which circulates through the first or low temperature loop.

The cascade heat pump system shown in FIG. 3 also includes an evaporator 118. The evaporator has an inlet 118a and an outlet 118b. The first working fluid liquid from the first expansion device enters the evaporator through the evaporator inlet and is evaporated in the evaporator to form a first working fluid vapor. The first working fluid vapor then circulates to the outlet of the evaporator.

The cascade heat pump system shown in FIG. 3 also includes a first compressor 120. The first compressor has an inlet 120a and an outlet 120b. The first working fluid vapor from the evaporator circulates to the inlet of the first compressor and is compressed, thereby increasing the pressure and the temperature of the first working fluid vapor. The compressed first working fluid vapor then circulates to the outlet of the first compressor.

The cascade heat pump system shown in FIG. 3 also includes a cascade heat exchanger system 122. The cascade heat exchanger has a first inlet 122a and a first outlet 122b. The first working fluid vapor from the first compressor enters the first inlet of the heat exchanger and is condensed in the heat exchanger to form a first working fluid liquid, thereby rejecting heat. The first working fluid liquid then circulates to the first outlet of the heat exchanger. The heat exchanger also includes a second inlet 122c and a second outlet 122d. A second working fluid liquid circulates from the second inlet to the second outlet of the heat exchanger and is evaporated to form a second working fluid vapor, thereby absorbing the heat rejected by the first working fluid (as it is condensed). The second working fluid vapor then circulates to the second outlet of the heat exchanger. Thus, in the embodiment of FIG. 3, the heat rejected by the first working fluid is directly absorbed by the second working fluid.

The cascade heat pump system shown in FIG. 3 also includes a second compressor 124. The second compressor has an inlet 124a and an outlet 124b. The second working fluid vapor from the cascade heat exchanger is drawn into the compressor through the inlet and is compressed, thereby increasing the pressure and temperature of the second working fluid vapor. The second working fluid vapor then circulates to the outlet of the second compressor.

The cascade heat pump system shown in FIG. 3 also includes a condenser 126 having an inlet 126a and an outlet 126b. The second working fluid from the second compressor circulates from the inlet and is condensed in the condenser to form a second working fluid liquid, thus producing heat. The second working fluid liquid exits the condenser through the outlet.

The cascade heat pump system shown in FIG. 3 also includes a second expansion device 128 having an inlet 128a and an outlet 128b. The second working fluid liquid passes through the second expansion device, which reduces the pressure and temperature of the second working fluid liquid exiting the condenser. This liquid may be partially vaporized during this expansion. The reduced pressure and temperature second working fluid liquid circulates to the second inlet of the cascade heat exchanger system from the expansion device.

Moreover, the stability of Z-HFO-1336mzz at temperatures higher than its critical temperature enables the design of heat pumps operated according to a transcritical or supercritical cycle in which heat is rejected by the working fluid in a supercritical state and made available for use over a range of temperatures (including temperatures higher that the critical temperature of Z-HFO-1336mzz) (see paper by Angelina and Invernizzi, is Int. J. Refrig., 1994, Vol. 17, No 8, pp 543-554, incorporated herein by reference). The supercritical fluid is cooled to a liquid state without a passing through an isothermal condensation transition. Various cycle configurations are described by Angelina and Invernizzi.

For high temperature condenser operation (associated with high temperature lifts and high compressor discharge temperatures) formulations of working fluid (e.g. Z-HFO-1336mzz or blends containing Z-HFO-1336mzz) and lubricants with high thermal stability (possibly in combination with oil cooling or other mitigation approaches) could be advantageous.

For high temperature condenser operation (associated with high temperature lifts and high compressor discharge temperatures) the use of magnetic centrifugal compressors (e.g. Danfoss-Turbocor type) that do not require the use of lubricants will be advantageous.

For high temperature condenser operation (associated with high temperature lifts and high compressor discharge temperatures) the use of compressor materials (e.g. shaft seals, etc) with high thermal stability may also be required.
Methods In one embodiment is provided a method for producing high temperature heat pump comprising condensing a vapor working fluid comprising 1,1,1,4,4,4-hexafluoro-2-butene, in a condenser, thereby producing a liquid working fluid.

In one embodiment, the heating is produced in a heat pump comprising said condenser, further comprising passing a heat transfer medium through the condenser, whereby said condensation of working fluid heats the heat transfer medium, and passing the heated heat transfer medium from the condenser to a body to be heated.

A body to be heated may be any space, object or fluid that may be heated. In one embodiment, a body to be heated may be a room, building, or the passenger compartment of an automobile. Alternatively, in another embodiment, a body to be heated may be a second or the medium or heat transfer fluid.

In one embodiment, the heat transfer medium is water and the body to be heated is water. In another embodiment, the heat transfer medium is water and the body to be heated is air for space heating. In another embodiment, the heat transfer medium is an industrial heat transfer liquid and the body to be heated is a chemical process stream.

In another embodiment, the method to produce heating further comprises compressing the working fluid vapor in a centrifugal compressor.

In one embodiment, the heating is produced in a heat pump comprising said condenser, further comprising passing a fluid to be heated through said condenser, thus heating the fluid. In one embodiment, the fluid is air, and the heated air from the condenser is passed to a space to be heated. In another embodiment, the fluid is a portion of a process stream, and the heated portion is returned to the process.

In some embodiments, the heat transfer medium may be selected from water, glycol (such as ethylene glycol or propylene glycol). Of particular note is an embodiment wherein the first heat transfer medium is water and the body to be cooled is air for space cooling.

In another embodiment, the heat transfer medium may be an industrial heat transfer liquid, wherein the body to be heated is a chemical process stream, which includes process lines and process equipment such as distillation columns. Of note are industrial heat transfer liquids including ionic liquids, various brines such as aqueous calcium or sodium chloride, glycols such as propylene glycol or ethylene glycol, methanol, and other heat transfer media such as those listed in section 4 of the 2006 ASHRAE Handbook on Refrigeration.

In one embodiment, the method for producing heating comprises extracting heat in a flooded evaporator high temperature heat pump as described above with respect to FIG. 1. In this method, the liquid working fluid is evaporated to form a working fluid vapor in the vicinity of a first heat transfer medium. The first heat transfer medium is a warm liquid, such as water, which is transported into the evaporator via a pipe from a low temperature heat source. The warm liquid is cooled and is returned to the low temperature heat source or is passed to a body to be cooled, such as a building. The working fluid vapor is then condensed in the vicinity of a second heat transfer medium, which is a chilled liquid which is brought in from the vicinity of a body to be heated (heat sink). The second heat transfer medium cools the working fluid such that it is condensed to form a liquid working fluid. In this method a flooded evaporator heat pump may also be used to heat domestic or service water or a process stream.

In another embodiment, the method for producing heating comprises producing heating in a direct expansion high temperature heat pump as described above with respect to FIG. 2. In this method, the liquid working fluid is passed through an evaporator and evaporates to produce a working fluid vapor. A first liquid heat transfer medium is cooled by the evaporating working fluid. The first liquid heat transfer medium is passed out of the evaporator to a low temperature heat source or a body to be cooled. The working fluid vapor is then condensed in the vicinity of a second heat transfer medium, which is a chilled liquid which is brought in from the vicinity of a body to be heated (heat sink). The second heat transfer medium cools the working fluid such that it is condensed to form a liquid working fluid. In this method, a direct expansion heat pump may also be used to heat domestic or service water or a process stream.

In some embodiments of the method for producing heat in a high temperature heat pump, heat is exchanged between at least two heating stages in what is referred to previously herein as a cascade heat pump. In these embodiments the method comprises absorbing heat in a working fluid in a heating stage operated at a selected condensing temperature and transferring this heat to the working fluid of another heating stage operated at a higher condensing temperature; wherein the working fluid of the heating stage operated at the higher condensing temperature comprises Z-1,1,1,4,4,4-hexafluoro-2-butene. The working fluid of the heating stage at the operated at the higher condensing temperature may additionally comprise 2-chloropropane. The method for producing heat may be accomplished in a cascade heat pump system with 2 heating stages or with a cascade heat pump system with more than 2 heating stages.

In one embodiment of the method for producing heating, the high temperature heat pump includes a compressor which is a centrifugal compressor.

In another embodiment of the invention is disclosed a method of raising the maximum feasible condenser operating temperature in a high temperature heat pump apparatus comprising charging the high temperature heat pump with a working fluid comprising Z-1,1,1,4,4,4-hexafluoro-2-butene.

Use of Z-HFO-1336mzz in high temperature heat pumps increases the capability of these heat pumps because it allows operation at condenser temperatures higher than achievable with working fluids used in similar systems today. The condenser temperatures achieved with HFC-245fa and CFC-114 are the highest achievable with current systems.

When CFC-114 is used as the working fluid in a high temperature heat pump, the maximum feasible condenser operating temperature with commonly available centrifugal heat pumps is about 122° C. In one embodiment of the method to raise the maximum feasible condenser operating temperature, when a composition comprising Z-1,1,1,4,4,4-hexafluoro-2-butene, is used as the heat pump working fluid, the maximum feasible condenser operating temperature is raised to a temperature greater than about 122° C.

In another embodiment of the method to raise the maximum feasible condenser operating temperature, when a composition comprising Z-1,1,1,4,4,4-hexafluoro-2-butene, is used as the heat pump working fluid, the maximum feasible condenser operating temperature is raised to a temperature greater than about 125° C.

In another embodiment of the method to raise the maximum feasible condenser operating temperature, when a composition comprising Z-1,1,1,4,4,4-hexafluoro-2-butene, is used as the heat pump working fluid, the maximum feasible condenser operating temperature is raised to a temperature greater than about 130° C.

In one embodiment, the maximum feasible condenser operating temperature, when the working fluid comprises Z-1,1,1,4,4,4-hexafluoro-2-butene, is raised to at least about 150° C.

In another embodiment, the maximum feasible condenser operating temperature, when the working fluid comprises Z-1,1,1,4,4,4-hexafluoro-2-butane, is raised to at least about 155° C.

In another embodiment, the maximum feasible condenser operating temperature, when the working fluid comprises Z-1,1,1,4,4,4-hexafluoro-2-butene, is raised to at least about 165° C.

It is feasible that temperatures as high as 170° C. (or higher when transcritical operation is allowed for) are achievable with a high temperature heat pump utilizing Z-1,1,1,4,4,4-hexafluoro-2-butene. However at temperatures above 155° C., some modification of compressor, or compressor materials, may be necessary.

In another embodiment of the present invention a method is provided for replacing a working fluid selected from the group consisting of CFC-114, HFC-134a, HFC-236fa, HFC-245fa, CFC-11 and HCFC-123 in a high temperature heat pump designed for said working fluid comprising providing a replacement working fluid comprising Z-1,1,1,4,4,4-hexafluoro-2-butene.

In another embodiment of the present invention a method is provided for using a working fluid composition comprising Z-HFO-1336mzz in a high temperature heat pump suitable for using a working fluid selected from the group consisting of CFC-114, HFC-134a, HFC-236fa, HFC-245fa, CFC-11 and HCFC-123. The method comprises charging the high temperature heat pump with the working fluid comprising Z-HFO-1336mzz. In another embodiment, the method comprises charging the high temperature heat pump with a working fluid comprising Z-HFO-1336mzz and 2-chloropropane. In another embodiment, the method comprises charging the high temperature heat pump with a working fluid consisting essentially of Z-HFO-1336mzz and 2-chloropropane. In another embodiment, the working fluid further comprises a lubricant.

In accordance with this invention it is possible to replace a high temperature heat pump fluid (for example, CFC-114 or HFC-245fa) in a system originally designed for said high temperature heat pump fluid with a working fluid comprising Z-HFO-1336mzz in order to raise the condenser operating temperature.

In accordance with this invention it is also possible to use a working fluid comprising Z-HFO-1336mzz in a system originally designed as a chiller using a conventional chiller working fluid (for example a chiller using HFC-134a or HCFC-123 or CFC-11 or CFC-12 or HFC-245fa) for the purpose of converting the system to a high temperature heat pump system. For example, a conventional chiller working fluid can be replaced in an existing chiller system with a working fluid comprising Z-HFO-1336mzz to achieve this purpose. In accordance with this invention it is also possible to use a working fluid comprising Z-HFO-1336mzz in a system originally designed as a comfort (i.e., low temperature) heat pump system using a conventional comfort heat pump working fluid (for example a heat pump using HFC-134a or HCFC-123 or CFC-11 or CFC-12 or HFC-245fa) for the purpose of converting the system to a high temperature heat pump system. For example, a conventional comfort heat pump working fluid can be replaced in an existing comfort heat pump system with a working fluid comprising Z-HFO-1336mzz to achieve this purpose.

EXAMPLES

The concepts disclosed herein will be further described in the following examples, which do not limit the scope of the invention described in the claims.
Operating Conditions Common for all Examples:
Sub-cooling=10.00° C.
Superheat added at the evaporator=15.00° C.
Compressor efficiency=0.80 (80%)

Example 1

Heating Performance with Available Heat Source at 25° C. for Z-HFO-1336mzz Versus HFC-245fa and CFC-114

The performance of Z-HFC-1336mzz in a water heating heat pump is determined and compared to performance for HFC-245fa and CFC-114. The data are shown in Tables 1(a) and 1(b). The data are based on the following conditions:

Evaporator temperature 25° C.
Condenser temperature 85° C.

TABLE 1(a)

| variable | units | HFC-245fa | Z-HFO-1336mzz | Z-HFO-1336mzz vs HFC-245fa (Δ %) |
|---|---|---|---|---|
| Pressure (condenser) | MPa | 0.89 | 0.49 | −45.28 |
| Pressure (evaporator) | MPa | 0.15 | 0.07 | −50.05 |
| Compressor Discharge Temperature | ° C. | 93.28 | 86.87 | |
| COP for Heating | | 4.174 | 4.200 | 0.62 |
| Volumetric Heating Capacity | kJ/m$^3$ | 1,402.37 | 743.06 | −47.01 |
| GWP* | | 1030 | 9.4 | |

Note that the GWP value for HFC-245fa is taken from: "Climate Change 2007 - IPCC (Intergovernmental Panel on Climate Change) Fourth Assessment Report on Climate Change", from the section entitled "Working Group 1 Report: "The Physical Science Basis", Chapter 2, pp. 212-213, Table 2.14. Specifically, the 100 year time horizon GWP values are used.

TABLE 1(b)

| variable | units | CFC-114 | Z-HFO-1336mzz | Z-HFO-1336mzz vs CFC-114 (Δ %) |
|---|---|---|---|---|
| Pressure (condenser) | MPa | 1.03 | 0.49 | −52.65 |
| Pressure (evaporator) | MPa | 0.21 | 0.07 | −65.40 |
| Compressor Discharge Temperature | ° C. | 90.41 | 86.87 | |
| COP for Heating | | 4.092 | 4.200 | 2.64 |
| Volumetric Heating Capacity | kJ/m$^3$ | 1,708.15 | 743.06 | −56.50 |
| GWP* | | 10,000 | 9.4 | |

Note that the GWP value for CFC-114 from Calm, J. M. and G. C. Hourahan, 2007, "Refrigerant data update," *Heating/Piping/Air Conditioning Engineering*, Vol. 79(1), pp. 50-64.

Use of Z-HFO-1336mzz enables this application with a COP for heating 0.62% higher than HFC-245fa and 2.64% higher than CFC-114. Moreover, Z-HFO-1336 m=offers a lower toxicity than HFC-245fa and substantially better environmental properties (i.e. zero ODP and very low GWP) than both CFC-114 and HFC-245fa. Z-HFO-1336mzz would not be a drop in replacement for HFC-245fa or CFC-114 in most cases due to its lower heating capacity. However, Z-HFO-1336mzz would serve as an excellent low GWP working fluid in new systems providing improved energy efficiency as compared to the existing working fluids/systems.

Example 2

Heating Performance with Available Heat Source at 50° C. for Z-HFO-1336mzz Versus HFC-245fa and CFC-114

The performance of Z-HFO-1336mzz in a water heating heat pump is determined and compared to performance for HFC-245fa and CFC-114. The data are shown in Tables 2(a) and 2(b). The data are based on the following conditions:

Evaporator temperature 50° C.
Condenser temperature 85° C.

TABLE 2(a)

| variable | units | HFC-245fa | Z-HFO-1336mzz | Z-HFO-1336mzz vs HFC-245fa (Δ %) |
|---|---|---|---|---|
| Pressure (condenser) | MPa | 0.89 | 0.49 | −45.28 |
| Pressure (evaporator) | MPa | 0.34 | 0.18 | −47.85 |
| Compressor Discharge Temperature | ° C. | 94.87 | 91.22 | |
| COP for Heating | | 7.770 | 7.879 | 1.40 |
| Volumetric Heating Capacity | kJ/m$^3$ | 3,157.63 | 1,761.49 | −44.21 |
| GWP* | | 1030 | 9.4 | |

TABLE 2(b)

| variable | units | CFC-114 | Z-HFO-1336mzz | Z-HFO-1336mzz vs CFC-114 (Δ %) |
|---|---|---|---|---|
| Pressure (condenser) | kPa | 1.03 | 0.49 | −52.65 |
| Pressure (evaporator) | kPa | 0.44 | 0.18 | −59.68 |
| Compressor Discharge Temperature | ° C. | 93.86 | 91.22 | |
| COP for Heating | | 7.675 | 7.879 | 2.66 |
| Volumetric Heating Capacity | kJ/m$^3$ | 3,524.54 | 1,761.49 | −50.02 |
| GWP* | | 10,000 | 9.4 | |

When the temperature of the available heat source ($T_{evap}$=50° C.) is higher relative to Example 1 ($T_{evap}$=25° C.) for the same required condenser temperature ($T_{cond}$=85° C.) the coefficient of performance (COP or energy efficiency) for heating and the volumetric heating capacity are markedly improved for all working fluids, especially for Z-HFO-1336mzz. The COP for heating with Z-HFO-1336mzz is 1.4% higher than HFC-245fa and 2.66% higher than CFC-114. Moreover, Z-HFO-1336mzz offers a lower toxicity than HFC-245fa and substantially better environmental properties (i.e. zero ODP and very low GWP) than both CFC-114 and HFC-245fa.

Example 3

Simultaneous Heating and Cooling Performance for Z-HFO-1336mzz Versus HFC-245fa and CFC-114

A heat pump can be used to simultaneously provide hot water for domestic use and chilled water for air conditioning. The performance of Z-HFO-1336mzz in a machine that provides heating and cooling simultaneously is determined and compared to performance for HFC-245fa and CFC-114. The data are shown in Tables 3(a) and 3(b). The data are based on the following conditions:

Evaporator temperature 5° C.
Condenser temperature

TABLE 3(a)

| variable | units | HFC-245fa | Z-HFO-1336mzz | Z-HFO-1336mzz vs HFC-245fa (Δ %) |
|---|---|---|---|---|
| Pressure (condenser) | MPa | 0.89 | 0.49 | −45.28 |
| Pressure (evaporator) | MPa | 0.07 | 0.03 | −52.19 |
| Compressor Discharge Temperature | ° C. | 94.36 | 85.47 | |
| COP for Heating | | 2.952 | 2.946 | −0.20 |
| Volumetric Heating Capacity | kJ/m$^3$ | 661.34 | 331.81 | −49.83 |

TABLE 3(a)-continued

| variable | units | HFC-245fa | Z-HFO-1336mzz | Z-HFO-1336mzz vs HFC-245fa (Δ %) |
|---|---|---|---|---|
| COP for Cooling | | 1.952 | 1.946 | −0.31 |
| Volumetric Cooling Capacity | kJ/m³ | 437.33 | 219.18 | −49.88 |
| Total COP | | 4.904 | 4.892 | −0.24 |
| GWP | | 1030 | 9.4 | |

TABLE 3(b)

| variable | units | CFC-114 | Z-HFO-1336mzz | Z-HFO-1336mzz vs CFC-114 (Δ %) |
|---|---|---|---|---|
| Pressure (condenser) | MPa | 1.03 | 0.49 | −52.65 |
| Pressure (evaporator) | MPa | 0.11 | 0.03 | −70.28 |
| Compressor Discharge Temperature | °C. | 89.18 | 85.47 | |
| COP for Heating | | 2.864 | 2.946 | 2.86 |
| Volumetric Heating Capacity | kJ/m³ | 878.28 | 331.81 | −62.22 |
| COP for Cooling | | 1.86 | 1.95 | 4.40 |
| Volumetric Cooling Capacity | kJ/m³ | 571.58 | 219.18 | −61.65 |
| Total COP | | 4.728 | 4.892 | 3.47 |
| GWP | | 10,000 | 9.4 | |

Z-HFO-1336mzz enables this application with an attractive total COP for simultaneous heating and cooling that is comparable to HFC-245fa and 147% higher than CFC-114. Moreover, Z-HFO-1336mzz offers a lower toxicity than HFC-245fa and substantially better environmental properties (i.e. zero ODP and very low GWP) than both CFC-114 and HFC-245fa.

Example 4

Heating Performance with Available Heat Source at 75° C. for Z-HFO-1336mzz Versus HFC-245fa and CFC-114

The performance of Z-HFO-1336mzz in a high temperature heat pump is determined and compared to performance for HFC-245fa and CFC-114. The data are shown in Tables 4(a) and 4(b). The data are based on the following conditions:

Evaporator temperature 75° C.
Condenser temperature 120° C.

TABLE 4(a)

| variable | units | HFC-245fa | Z-HFO-1336mzz | Z-HFO-1336mzz vs HFC-245fa (Δ %) |
|---|---|---|---|---|
| Pressure (condenser) | MPa | 1.93 | 1.10 | −42.98 |
| Pressure (evaporator) | MPa | 0.69 | 0.37 | −45.98 |
| Compressor Discharge Temperature | °C. | 128.12 | 122.87 | |
| COP for Heating | | 5.933 | 6.157 | 3.78 |
| Volumetric Heating Capacity | kJ/m³ | 5,017.79 | 2,991.66 | −40.38 |
| GWP* | | 1030 | 9.4 | |

TABLE 4(b)

| variable | units | CFC-114 | Z-HFO-1336mzz | Z-HFO-1336mzz vs CFC-114 (Δ %) |
|---|---|---|---|---|
| Pressure (condenser) | kPa | 2.07 | 1.10 | −46.87 |
| Pressure (evaporator) | kPa | 0.82 | 0.37 | −54.53 |
| Compressor Discharge Temperature | °C. | 128.82 | 122.87 | |
| COP for Heating | | 5.764 | 6.157 | 6.82 |
| Volumetric Heating Capacity | kJ/m³ | 5,158.96 | 2,991.66 | −42.01 |
| GWP* | | 10,000 | 9.4 | |

The performance of Z-HFO-1336mzz relative to HFC-245fa and CFC-114 improves markedly at higher operating temperatures. Z-HFO-1336mzz enables an application requiring a condenser temperature of 120° C. using available heat that allows an evaporator temperature of 75° C. with a COP (energy efficiency) for heating 338% higher than HFC-245fa and 6.82% higher than CFC-114. Moreover, Z-HFO-1336mzz offers a lower toxicity than HFC-245fa and substantially better environmental properties (i.e. zero ODP and very low GWP) than both CFC-114 and HFC-245fa.

Example 5

Heating Performance with Available Heat Source at 100° C. and 120° C. for Z-HFO-1336mzz The performance of Z-HFO-1336mzz in a high temperature heat pump is determined and compared to performance for HFC-245fa and CFC-114. The data are shown in Table 5. The data are based on the following conditions:

Condenser temperature 155° C.

TABLE 5

| variable | units | Z-HFO-1336mzz | Z-HFO-1336mzz |
|---|---|---|---|
| Temperature (evaporator) | °C. | 100 | 120 |
| Pressure (condenser) | MPa | 2.18 | 2.18 |
| Pressure (evaporator) | MPa | 0.70 | 1.10 |
| Compressor Discharge Temperature | °C. | 159.29 | 163.74 |
| COP for Heating | | 4.568 | 8.034 |
| Volumetric Heating Capacity | kJ/m³ | 4,121.62 | 7,003.43 |

A condenser temperature of 155° C. exceeds the critical temperature of both HFC-245fa and CFC-114, thus a heat pump rejecting heat through a conventional condensation step cannot operate with either of these working fluids at this condenser temperature. Z-HFO-1336mzz generates a vapor pressure of about 2.18 MPa at a temperature of 155° C. Commonly available large tonnage centrifugal chiller components can accommodate maximum working pressures of up to about 2.18 MPa without major modifications. Therefore, Z-HFO-1336mzz can enable applications meeting heating duties requiring condenser temperatures up to about 155° C. with systems largely consisting of commonly available large tonnage centrifugal chiller components. Moreover, Z-HFO-1336mzz is non-flammable, has an attractive toxicity profile and attractive environmental properties, including excellent energy efficiency (COP) for these operating conditions.

Example 6

Chemical and Thermal Stability of Z-HFO-1336mzz

The chemical stability of Z-HFO-1336mzz in the presence of metals was scrutinized according to the sealed tube testing methodology of ANSI/ASHRAE Standard 97-2007. The stock of Z-HFO-1336mzz used in the sealed tube tests was 99.9864+wt % pure (136 ppmw of impurities) and contained virtually no water or air.

Sealed glass tubes, each containing three metal coupons made of steel, copper, and aluminum immersed in Z-HFO-1336mzz, were aged in a heated oven at various temperatures up to 250° C. for 14 days. Visual inspection of the tubes after thermal aging indicated clear liquids with no discoloration or other visible deterioration of the fluid. Moreover, there was no change in the appearance of the metal coupons indicating corrosion or other degradation.

Table 6 shows the measured concentrations of fluoride ion in the aged liquid samples. The fluoride ion concentration can be interpreted as an indicator of the degree of Z-HFO-1336mzz degradation. Table 3 indicates that Z-HFO-1336mzz degradation was surprisingly minimal even at the highest temperature tested (250° C.).

TABLE 6

Fluoride ion concentration in Z-HFO-1336mzz samples after aging at various temperatures for two weeks.

| Aging Temperature [° C.] | F-ion [ppm] |
| --- | --- |
| 175 | <0.15(*) |
| 200 | 0.18 |
| 225 | 0.23 |
| 250 | 1.50 |

(*)no detectable fluoride (within the method detection limit of 0.15 ppm)

Table 7 shows compositional changes, quantified by GCMS, of Z-HFO-1336mzz samples after aging in the presence of steel, copper and aluminum at various temperatures for two weeks. Only negligible proportions of new unknown compounds appeared as a result of aging even at the highest temperature tested (250° C.).

The trans isomer of HFO-1336mzz, E-E-HFO-1336mzz, is expected to be thermodynamically more stable than the cis isomer, Z-HFO-1336mzz, by about 5 kcal/mole. Surprisingly, despite the substantial thermodynamic driving force for isomerization of Z-HFO-1336mzz to the more stable trans isomer, the measured results in Table 7 indicate that Z-HFO-1336mzz remained largely in the Z (or cis) isomeric form even at the highest temperature tested (250° C.). The effect of the small proportion (3,022.7 ppm or 0.30227 wt %) of E-HFO-1336mzz that formed after two weeks of aging at 250° C. on the thermodynamic properties of the working is fluid (Z-HFO-1336mzz) and, therefore on the cycle performance, would be negligible.

TABLE 7

Compositional changes of Z-HFO-1336mzz samples (quantified by GCMS) after aging in the presence of steel, copper and aluminum coupons at various temperatures for two weeks.

| Aging Temperature [° C.] | E-HFO-1336mzz [ppm] (by GC peak area) | Unknown compounds (formed as a result of aging) [ppm] (by GC peak area) |
| --- | --- | --- |
| Initial stock of Z-HFO-1336mzz (unaged) | Not present | Not present |
| 150 | 23.8 | 0.5 |
| 175 | 38.7 | 4.0 |
| 200 | 116.6 | 25.0 |
| 225 | 343.4 | 77.1 |
| 250 | 3,022.7 | 425.5 |

Example 7

Flammability of Z-HFO-1336mzz/2-Chloropropane Mixtures

The non-flammable range for compositions comprising Z-HFO-1336 mzz and 2-chloropropane was determined according to the ASTM E681-2001 test procedure as required in ASHRAE Standard 34-2007 and described in "Addendum p" to ASHRAE Standard 34-2007. Test conditions were 60° C., with 50% relative humidity.

A composition containing 95 weight percent Z-HFO-1336mzz and 5 weight percent 2-chloropropane was tested as described above and was found to be flammable, with a lower flammability limit (LFL) of 7.75 volume percent in air and an upper flammability limit (UFL) of 8.0 volume percent in air. Then a composition containing 96 weight percent Z-HFO-1336 mzz and 4 weight percent 2-chloropropane was tested as described above and was found to be non-flammable. Therefore compositions with less than 5 is weight percent 2-chloropropane are expected to be non-flammable, while compositions containing 4 weight percent or less are non-flammable.

Example 8

Performance of a High Temperature Heat Pump with a Z-HFO-1336mzz/2-Chloropropane 80/20 Wt % Mixture as the Working Fluid Table 8 summarizes the performance of a heat pump with a working fluid consisting of 80 wt % Z-HFO-1336mzz and 20 wt % 2-chloropropane, referred to as "Blend A".

TABLE 8

Performance of heat pump with a working fluid consisting of 80 wt % Z-HFO-1336mzz and 20 wt % 2-chloropropane

| | Neat Z-HFO-1336mzz | Blend A |
| --- | --- | --- |
| Z-HFO-1336mzz, wt % | 100 | 80 |
| 2-Chloropropane, wt % | 0 | 20 |
| Condenser temperature, ° C. | 120 | 120 |
| Evaporator temperature, ° C. | 75 | 75 |
| Condenser Pressure, MPa | 1.1 | 1.15 |
| Evaporator Pressure, MPa | 0.37 | 0.40 |
| Glide-Evaporator, ° C. | 0 | 0.05 |
| Glide-Condenser, ° C. | 0 | 0 |
| Compressor Discharge Temperature, ° C. | 122.9 | 134.4 |

TABLE 8-continued

Performance of heat pump with a working fluid consisting of 80 wt % Z-HFO-1336mzz and 20 wt % 2-chloropropane

|  | Neat Z-HFO-1336mzz | Blend A |
|---|---|---|
| COP for Heating | 6.157 | 6.321 |
| Volumetric Heating Capacity, kJ/m$^3$ | 2990 | 3308 |

Blend A has substantially higher energy efficiency for heating and volumetric heating capacity than neat Z-HFO-1336mzz. It is also expected to have a higher compatibility with mineral oil lubricants than neat Z-HFO-1336mzz. Blend A is also expected to have substantially higher thermal stability and substantially lower flammability than neat 2-chloropropane.

What is claimed is:

1. A high temperature heat pump apparatus containing a working fluid comprising Z-1,1,1,4,4,4-hexafluoro-2-butene; wherein said apparatus comprises a condenser; and wherein the condenser operates at a temperature of at least 100° C.; wherein a COP achieved is improved over COP achieved when CFC-114 is used as a working fluid.

2. The high temperature heat pump apparatus of claim 1 wherein said apparatus comprises a compressor selected from the group consisting of centrifugal compressors, axial compressors, reciprocating compressors, screw compressors and scroll compressors.

3. The high temperature heat pump apparatus of claim 2, wherein said compressor is a centrifugal compressor.

4. The high temperature heat pump apparatus of claim 1 having at least two heating stages arranged as a cascade heating system, each stage circulating a working fluid therethrough, wherein heat is transferred to a final stage from a preceding stage and wherein the heating fluid of the final stage comprises Z-1,1,1,4,4,4-hexafluoro-2-butene.

5. The high temperature heat pump apparatus of claim 4, wherein the working fluid of the stage preceding the final stage comprises at least one fluoroolefin selected from the group consisting of HFO-1234yf and E-1234ze.

6. The high temperature heat pump apparatus of claim 4 wherein the working fluid of the stage preceding the final stage comprises at least one fluoroalkane selected from the group consisting of HFC-134a, HFC-134 and HFC-227ea.

7. The high temperature heat pump apparatus of claim 1 having at least two heating stages arranged as a cascade heating system, each stage circulating a working fluid therethrough comprising:
(a) a first expansion device for reducing the pressure and temperature of a first working fluid liquid;
(b) an evaporator having an inlet and an outlet, wherein the first working fluid liquid from the first expansion device enters the evaporator through the evaporator inlet and is evaporated in the evaporator to form a first working fluid vapor, and circulates to the outlet;
(c) a first compressor having an inlet and an outlet, wherein the first working fluid vapor from the evaporator circulates to the inlet of the first compressor and is compressed, thereby increasing the pressure and the temperature of the first working fluid vapor, and the compressed first working fluid vapor circulates to the outlet of the first compressor;
(d) a cascade heat exchanger system having:
(i) a first inlet and a first outlet, wherein the first working fluid vapor circulates from the first inlet to the first outlet and is condensed in the heat exchanger system to form a first working fluid liquid, thereby rejecting heat, and
(ii) a second inlet and a second outlet, wherein a second working fluid liquid circulates from the second inlet to the second outlet and absorbs the heat rejected by the first working fluid and forms a second working fluid vapor;
(e) a second compressor having an inlet and an outlet, wherein the second working fluid vapor from the cascade heat exchanger system is drawn into the compressor and is compressed, thereby increasing the pressure and temperature of the second working fluid vapor;
(f) the condenser having an inlet and an outlet for circulating the second working fluid vapor therethrough and for condensing the second working fluid vapor from the compressor to form a second working fluid liquid, thereby producing heat, wherein the second working fluid liquid exits the condenser through the outlet; and
(g) a second expansion device for reducing the pressure and temperature of the second working fluid liquid exiting the condenser and entering the second inlet of the cascade heat exchanger system;
wherein the second working fluids comprises Z-1,1,1,4,4,4-hexafluoro-2-butene.

8. The high temperature heat pump apparatus of claim 7, wherein the first working fluid comprises at least one fluoroolefin selected from the group consisting of HFO-1234yf and E-1234ze.

9. The high temperature heat pump apparatus of claim 7 wherein the first working fluid comprises at least one fluoroalkane selected from the group consisting of HFC-134a, HFC-134 and HFC-227ea.

10. A high temperature heat pump apparatus containing a working fluid comprising Z-1,1,1,4,4,4-hexafluoro-2-butene; wherein said apparatus comprises a condenser; and wherein the condenser operates at a temperature of at least 100° C.; wherein a COP achieved is greater than the COP achieved when CFC-114 is used as a working fluid.

* * * * *